United States Patent
Misra et al.

(10) Patent No.: US 11,625,317 B2
(45) Date of Patent: Apr. 11, 2023

(54) SYSTEMS AND METHODS FOR QUALITY CONTROL OF AN ENTERPRISE IT ENVIRONMENT

(71) Applicant: GalaxE.Solutions, Inc., Somerset, NJ (US)

(72) Inventors: Dheeraj Misra, Somerset, NJ (US); Sandipan Gangopadhyay, Somerset, NJ (US); Tim Bryan, Somerset, NJ (US)

(73) Assignee: GalaxE.Solutions, Inc., Somerset, NJ (US)

(*) Notice: Subject to any disclaimer, the term of this patent is extended or adjusted under 35 U.S.C. 154(b) by 7 days.

(21) Appl. No.: 16/746,643

(22) Filed: Jan. 17, 2020

(65) Prior Publication Data

US 2020/0233784 A1 Jul. 23, 2020

Related U.S. Application Data

(60) Provisional application No. 62/794,362, filed on Jan. 18, 2019.

(51) Int. Cl.
*G06F 11/00* (2006.01)
*G06F 11/36* (2006.01)

(52) U.S. Cl.
CPC ...... *G06F 11/3684* (2013.01); *G06F 11/3616* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 8,347,267 B2* | 1/2013 | Givoni | G06F 11/3664 717/124 |
| 8,522,196 B1* | 8/2013 | Kim | G06F 11/3664 717/105 |
| 8,543,983 B2* | 9/2013 | Murthy | G06F 11/3684 717/125 |
| 9,021,440 B1* | 4/2015 | Chandrasekaran | G06F 11/3684 717/124 |
| 9,280,452 B1* | 3/2016 | Mahadevan | G06F 11/3684 |
| 2009/0300585 A1* | 12/2009 | Meenakshisundaram | G06F 11/3688 717/124 |
| 2013/0185667 A1 | 7/2013 | Harper et al. | |
| 2014/0172512 A1* | 6/2014 | Chandra | G06F 9/46 705/7.37 |
| 2016/0291972 A1* | 10/2016 | Bryan | G06F 8/73 |

(Continued)

OTHER PUBLICATIONS

Google Patents/Scholar—text refined (Year: 2021).*

(Continued)

*Primary Examiner* — Christopher S McCarthy
(74) *Attorney, Agent, or Firm* — Crowell & Moring LLP

(57) ABSTRACT

A system for auditing an enterprise IT environment includes a multi-tier hierarchy generator configured to generate a multi-tier hierarchy, between and within each tier, maps the IT environment across a plurality of software applications of different types via which the IT environment is implemented. The system includes a test generation engine configured to generate test cases based on intake data about the IT environment. The system includes an auditing unit configured to test the IT environment based on the test cases and the multi-tier hierarchy.

10 Claims, 3 Drawing Sheets

(56) References Cited

U.S. PATENT DOCUMENTS

2017/0286277 A1   10/2017  Lau et al.
2018/0267887 A1*  9/2018  Dsouza .................. G06F 40/30
2019/0243751 A1*  8/2019  Ganda ................. G06F 11/3692

OTHER PUBLICATIONS

Google Scholar/Patents search—text refined (Year: 2022).*
PCT/US20/14196, International Search Report (PCT/ISA/210 and PCT/ISA/220) dated Apr. 21, 2020, enclosing Written Opinion of the International Searching Authority (PCT/ISA/237) (Seven (7) pages).
International Preliminary Report on Patentability (PCT/IB/326 and PCT/IB/373) and Written Opinion (PCT/ISA/237) dated Jul. 29, 2021 (Six (6) pages).
English-language Indian Office Action issued in Indian application No. 202117034973 dated Jan. 17, 2023 (Eight (8) pages).

* cited by examiner

SYSTEMS AND METHODS FOR QUALITY CONTROL OF AN ENTERPRISE IT ENVIRONMENT

This application claims the benefit of U.S. Provisional Application No. 62/794,362, filed on Jan. 18, 2019, the entire contents of which are hereby incorporated by reference.

BACKGROUND ART

With evolving business needs, the architectural complexity behind the integration scheme of legacy and modern business applications within the enterprise IT environment increases over time. Between legacy and modern applications, the legacy applications are typically considered more difficult to maintain, modify, or enhance because there is a general lack of understanding about the legacy application and its dependencies with other applications. For example, those individuals who were considered experts on the subject matter of the legacy application may no longer be available as a resource, whether by retirement or loss of knowledge and expertise over extended periods of time. The situation is worsened with a lack of accessible documentation concerning the operation and integration of the legacy application. For these reasons, a legacy business application can present challenges for those individuals who later join the business organization.

When an IT environment develops an complex architecture, e.g., because of the integration scheme of legacy and modern business applications within the enterprise IT environment, there is typically a lack of available subject matter expertise that presents difficulties and challenges in, for example: (1) analyzing the impact on the enterprise IT environment due to a programming change; (2) assessing potential risks posed by a programming change; (3) sizing the change and regression impact; (4) identifying those project stakeholders who may be impacted by a change; (5) planning the regression test; (6) designing the change optimally; and (7) delivering the change quickly and effectively to the business.

In order to overcome the above challenges and to efficiently and effectively analyze the need for a programming change to a legacy business application and the impact on an enterprise IT environment due to the programming change, the enterprise should be able to easily and quickly identify cross dependencies among applications (both new and legacy) and across the applications' corresponding technology and architectural tiers.

While it is known that the cross-dependency maps are crucial for this type of analysis, it is a complex, time-consuming, and expensive task for the enterprise to generate a useful cross-dependency map from application source code automatically and on-demand. Typically, cross-tier analysis is performed manually, which is time-consuming and prone to error.

Prior methods of generating cross-dependency maps are infrastructure centric and not application centric. There are agent-based or agentless techniques available that probe or detect activities in the server infrastructure, but these techniques do not help perform an analysis of the larger impact resulting from a change to a software application. In addition, the prior methods can only identify hierarchy within a technology tier, which forces a cross-tier analysis to be performed manually. These prior methods are targeted for modern applications, but not for the practical enterprise with an IT environment that includes disparate legacy and modern business applications.

Quality control measures of such enterprise IT environments also face substantial hardships due to these factors. For example, it is difficult to test for desired functionality across and among systems and technologies, and legacy and modern applications. As such, determining whether and how to modify the enterprise IT environment, or whether such modifications are or will be effective, is likewise difficult. Moreover, reverse engineering and regression testing across and among different systems and technologies is severely limited using current techniques.

In that regard, a system and method for quality control of an enterprise IT environment, for example, is disclosed herein, which overcomes these and other shortcomings of prior systems.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

DETAILED DESCRIPTION OF EMBODIMENTS OF THE INVENTION

Figure 1:
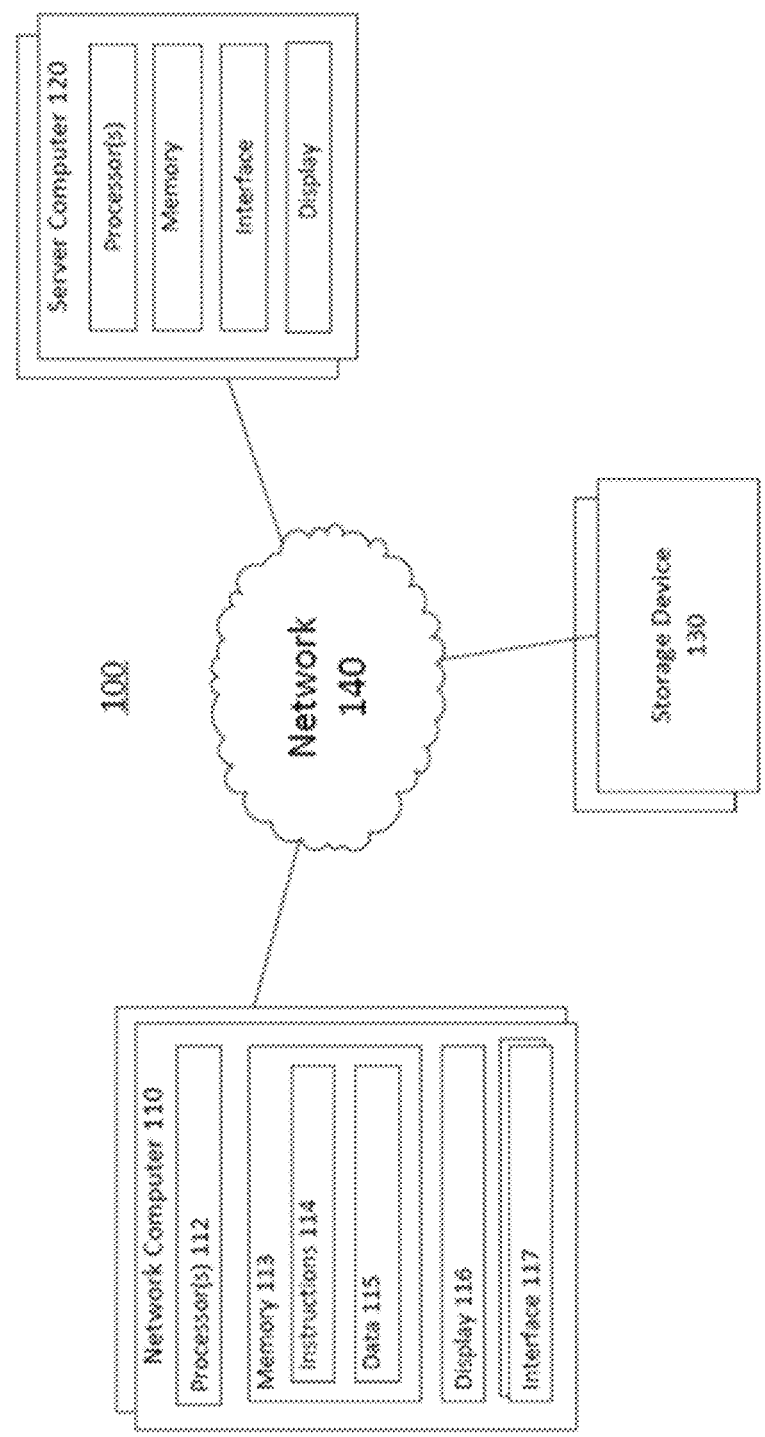
FIG. 1 illustrates an example system in accordance with one or more aspects of the disclosure.

The disclosure is directed to enterprise information technology (IT) environments, and more particularly to more efficient management of such enterprise IT environments through automated quality control of the enterprise IT environment using cross-application dependency mapping.

A system and method for quality control of an enterprise IT environment is described herein. Automated code parsing techniques, for example, are used to identify dependencies between and among different business applications within the IT environment, including for both legacy and modern business applications. An interactive visualization of an enterprise IT environment may be provided, which may facilitate a thorough audit of the enterprise-wide IT environment, including whether the IT environment meets certain business and technical requirements, for example. In one aspect, there is the ability to perform canonical and customized searches of dependent elements between components of the IT environment and generate impact reports that can show how desired changes to particular applications may affect the environment. In another aspect, there is the ability to provide end-to-end quality assurance through, for example, automatically determining test cases, as well as generating test scenarios and data, and utilizing the test cases, scenarios and/or data to test, validate, troubleshoot and/or provide a roadmap for transitioning one or more aspects of the enterprise IT environment.

The present disclosure provides a number of benefits and/or advantages over prior methods of auditing an IT environment. For example, complex and complete bottom-up parsing and analysis of the code base, including all legacy and modern business applications that are part of the larger enterprise IT environment, is available which may help eliminate the draw-backs of a top-down approach to mapping, such as the failure to identify many critical elements and dependencies of the applications in an IT environment. There is end-to-end traceability and the ability to perform scenario-based simulations of changes to the code base to identify how changes to the code of legacy and/or modern business applications will impact the overall enterprise IT environment. In that regard, automated generation of cross-application dependency maps may be used to search for and identify impacted high-level use cases, transaction and screen flows, code, data elements, files, and other technical assets across the enterprise IT environment.

An additional benefit and/or advantage, for example, may be that automated dependency mapping will assist in prioritizing application deliverables and minimize or even eliminate unintentional impact to the enterprise IT environment. Targeted complexity and risk analysis allows for efficiency and timeliness of key decision-making that impacts the overall enterprise on a daily basis. Impact assessment may drive and enhance the comprehensiveness of enterprise environment requirements and design, and provide guidance for targeted regression analysis and test and code coverage metrics, including an assessment of the risk associated with any proposed change to one or more components of the enterprise IT environment. Test cases may be automatically generated and require only subject matter expert (SME) validation.

A further additional benefit and/or advantage, for example, is that integration may be possible with a variety of tools, including MULE ESB (with an available ID Auto Code Generation enhancement), and automatic identification is capable for dead code, obsolete functions, sequence flow, and data points that may be used to establish caller and callee identity. The described automated cross-application dependency mapping may provide efficiency gains of up to eighty percent over traditional manual-based methods.

While the invention may be used in connection with C, C++, VB6, .Net suite, Java/J2EE, Cobol, DCLGEN, JCL, PL/SQL, and Oracle Forms, it should be appreciated that the invention may be equally applicable to other known or future programming languages as well.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail.

FIG. 1 illustrates an example system 100 in accordance with one or more aspects of the disclosure. For instance, system 100 may represent at least a portion of an IT environment. System 100 may include a plurality of computers and/or computing devices, such as, network computer 110, server computer 120, and storage device 130. By way of example only, network computer 110 is connected to network 140 and may include different types of components associated with a computer, such as one or more processors 112, memory 113, instructions 114, data 115, display 116, and an interface 117. The network computer 110 may be mobile (e.g., laptop computer, tablet computer, smartphone, PDA, etc.) or stationary (e.g., desktop computer, etc.). Similarly, server computer 120 may also include one or more processors, memory, interface, and/or display and may be configured to communicate with other computer devices on network 140.

The processor 112 of network computer 110 may instruct the components thereof to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores at least instructions 114 and/or data 115 that can be accessed by processor 112. For example, memory 113 may be hardware capable of storing information accessible by the processor, such as a ROM, RAM, hard-drive, CD-ROM, DVD, write-capable, read-only, etc. The set of instructions may be included in software that can be implemented on the network computer 110 and should be noted that the terms "instructions," "steps," "algorithm," and "programs" may be used interchangeably. Data 115 can be retrieved, manipulated or stored by the processor 112 in accordance with the set of instructions 114 or other sets of executable instructions. The data 115 may be stored as a collection of data.

The display 116 may be any type of device capable of communicating data to a user, such as a liquid-crystal display ("LCD") screen, a plasma screen, etc. Interface 117 allow a user to communicate with the network computer 110 and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer 120 (and additional server computers) may be rack mounted on a network equipment rack and/or located, for instance, in a data center. In one example, the server computer 120 may use the network 140 to serve the requests of programs executed on network computer 110 and/or storage device 130.

The storage device 130 illustrated in FIG. 1 may be configured to store large quantities of data and/or information. For example, the storage device 130 may be a collection of storage components, or a mixed collection of storage components, such as ROM, RAM, hard-drives, solid-state drives, removable drives, network storage, virtual memory, cache, registers, etc. The storage device 130 may also be configured so that the network computer 110 and/or server computer 120 may access it via the network 140.

The network 140 may be any type of network, wired or wireless, configured to facilitate the communication and transmission of data, instructions, etc. from one component to another component of the network. For example, the network 140 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the network configuration illustrated in FIG. 1 serves only as an example and is thus not limited thereto. System 100, for instance, may include numerous other components connected to network 140, include more than one of each network component (as shown by the cascaded blocks), and network 140 may be connected to other networks.

Figure 2:
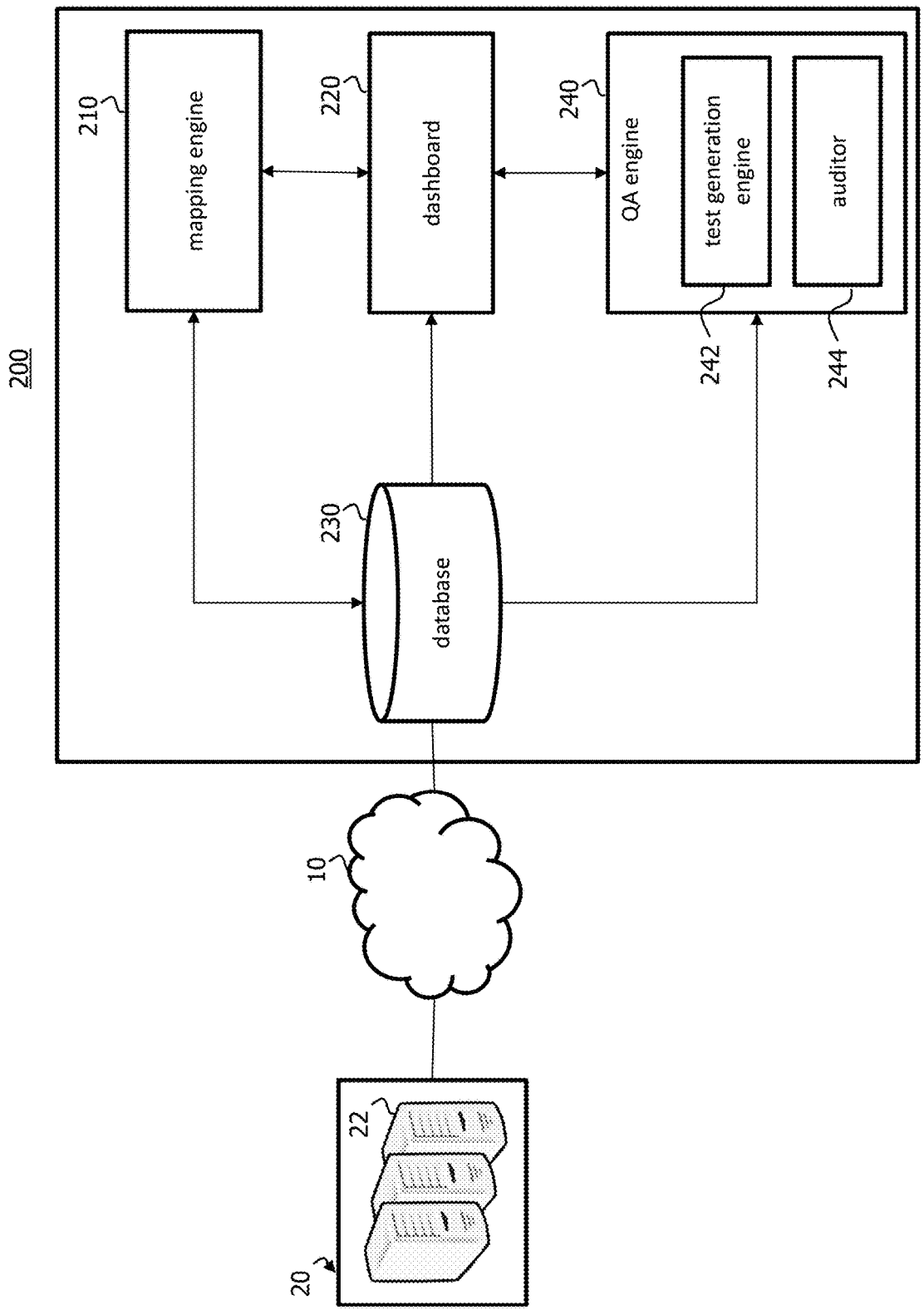
FIG. 2 illustrates a diagram of the architecture in accordance with one or more aspects of the disclosure.

FIG. 2 illustrates one embodiment of an architecture 200 for quality control of an enterprise-wide IT environment. The architecture 200 shown in FIG. 2 includes a system mapping engine 210, a dashboard 220, a database 230, and a quality assurance engine 240, and is operatively coupled to one or more source systems 22 of the enterprise IT environment 20 via external network 10. The source systems 22 may include and/or implicate business applications, use cases, transactions and/or data elements, involving disparate technologies relied on by the enterprise IT environment 20.

One example of the operation of the system architecture shown in FIG. 2 is as follows. Source code and database reflecting the current state of the enterprise IT environment 20 is provided from the one or more source systems 22 to the system mapping engine 210, which may utilize automated parsing techniques to identify dependencies between and among different business applications, use cases, transactions, data elements and code assets, within the enterprise IT environment 20. The system mapping engine 210 then analyzes the information and determines links between and among the parsed information, from which a multi-tier hierarchy map is built that, for each tier, maps the enterprise IT environment 20 across the different systems 22 and technologies of the enterprise IT environment 20. These links and/or the generated multi-tier hierarchy map are populated to the database 230.

Exemplary automated parsing and cross-application dependency mapping techniques that may be utilized are disclosed, for example, in U.S. application Ser. No. 15/087,786, entitled "System and method for Automated Cross-Application Dependency Mapping," filed on Mar. 31, 2016, the contents of which are incorporated herein by reference in its entirety. It will be understood, however, that unique mappings for each system 22 and system transition may be undertaken.

A "business process" tier maps the enterprise IT environment according to the different business processes of the enterprise IT environment. In building the business process tier, the information extracted from the source code and/or database is tied to the business processes implemented by the enterprise IT environment. A "use case" tier maps the enterprise IT environment according to its different use cases. In building the use case tier, the information extracted from the source code and/or database is tied to the use cases implemented by the enterprise IT environment. A "system modules" tier maps the enterprise IT environment according to its different system modules. In building the system modules tier, the information extracted from the source code and/or database is tied to the system modules of the enterprise IT environment. A "source code" tier maps the enterprise IT environment according to its source code. In building the source code tier, the information extracted from the source code and/or database is used to map the source code to operations or tasks of the enterprise IT environment. A "data elements" tier maps the IT environment according to its data elements. In building the source code tier, the information extracted from the source code and/or database is used to map the data elements to operations or tasks of the enterprise IT environment.

The mapping engine 210 also builds the multi-tier hierarchy such that that, each tier is mapped to each other tier. For example, a given business process may include implicate one or more use cases, which may in turn implicate several system modules, and so on down the hierarchy. In the reverse direction, a given code asset or data element may implicate one or more system modules, which may in turn implicate several use cases, which may in turn implicate several business processes. The mapping engine 210 takes into account these dependencies in building the multi-tier hierarchy based on the parsed information.

According to a further aspect of the invention, quality assurance is maintained by the quality assurance engine 240, which includes a test generation engine 242 and an auditor 244, together configured to provide end-to-end quality assurance. The end-to-end quality assurance is provided through, for example, automatically determining test cases, as well as generating test scenarios and data, and utilizing the test cases, scenarios and/or data to test, validate, troubleshoot and/or provide a roadmap for transitioning one or more aspects of the enterprise IT environment.

The test cases, scenarios and/or data may be determined by the test generation engine 242 based on data retrieved about the source system from the database 230. Synthetic test cases, scenarios and/or data may also be generated by the test generation engine 242 based on data retrieved about the source system from the database 230. Automation techniques and/or machine learning artificial intelligence may be utilized to determine and/or generate the test cases, scenarios and/or data. Test scripts may also be determined and/or generated in similar manner.

The auditor 244 tests the enterprise IT environment utilizing multi-tier hierarchy and the test scripts, scenarios, cases and/or data. The testing may include, for example, integration testing, white box testing and/or black box testing. The testing may also include testing the enterprise IT environment against business and/or technical requirements, which may be pre-existing and/or user-created, and may be input from the database and/or via the user input/output device. Testing therefore involves retrieving the latest builds of enterprise IT environment or aspects thereof.

In testing the enterprise IT environment, the auditor may determine across and among tiers of the hierarchy, whether the enterprise IT environment is different from any requirements, is missing for any requirements, and/or is an implementation for which there is no requirement. A gap is identified when any of these conditions are determined to exist. Such gaps are identified in association with the appropriate tier, reflecting that the implementation at that tier differs from the requirements tested for. The gaps are provided to the user in connection with the multi-tier hierarchy, and may be similarly accessed by the user through the input/output device, as discussed herein.

According to an additional aspect, source code and database reflecting a target state of the IT environment may be similarly mapped to the multi-tiered hierarchy. As such, the dependencies may be utilized to inform users how the IT environment may be affected by a change from the current state to a target state, including whether the requirements are met by the change.

The multi-tier hierarchy may be accessed by the user through the input/output device, such as a GUI of the network computer 110 and/or the server computer 120, as illustrated in FIG. 1, via the dashboard 220. By way of example, the multi-tier hierarchy may be used, or may be further depended on by other network computers, to maintain, modify, and/or enhance the various applications (and the above-described source files) that are associated with the IT environment. For instance, the multi-tier hierarchy may be used to generate service reports for particular end users, customers, and/or consumers, which may be a series of reports on the various hierarchy tiers associated with the IT environment. These service reports may provide detailed analysis of the tiers and the overall impact and/or implications on the IT environment. In one example, a service report may be in digital format and may be utilized on one or more GUIs by the end user, customers, and/or consumers.

In at least one aspect, the dashboard 220 provides an interactive visualization of the enterprise IT environment, which visualization corresponds to the multi-tier hierarchy that is interactable with by the user, e.g., via the GUI, to navigate among and across the tiers of the hierarchy. Thus, for example, the user may navigate from a use case, test case, or business rule, directly to the code it relates to and vice versa.

The dashboard 220 additionally provides an interactive platform by which the user may control the testing. Utilizing the dashboard 220, the user can define the scope of the test and control the automated generation of the test cases, scenarios and/or data used. Reports may be generated detailing results of the testing, and the dashboard 220 may also provide the interactive platform by which the user may interact with the generated reports. The reports may include the complete details of a particular service operation or task or corresponding transactions, source code or data elements, generated in accordance with the multi-tier hierarchy and tested by the testing engine. Such reports may relate to a current state analysis, a target state analysis, a test case analysis, and a business rule analysis. The reports may also provide a visual mapping between current and target states, including scenario based simulation visualization.

The dashboard 220 may also be configured to facilitate code and/or logic migration from legacy (i.e., current state) components of the enterprise IT environment to modern (i.e., target state) components. Code files may be automatically generated in the target components, which have been mapped to the current state components via the multi-tier hierarchy, which are then utilized to migrate logic from the legacy components.

The dashboard 220 may also be configured to conduct a semantic analysis on a search string input by the user, e.g., via the GUI, and to present an associated dependency map that identifies portions of the enterprise IT environment relevant to the search string. The semantic analysis includes consulting the multi-tier hierarchy for dependencies across and among tiers. As such, the search module 228 may be utilized to search for and identify high-level use cases, transaction flows, etc. across the enterprise IT environment that are impacted by the test scenarios, etc.

Accordingly, the functionality of enterprise IT environment may be decomposed in a highly intuitive manner in response to and in the facilitation of the testing. End-to-end traceability of the enterprise IT environment across and among each of the tiers of the multi-tier hierarchy may also be provided. A comprehensive assessment of the enterprise IT environment is thereby facilitated, including functional and non-functional testing, such as, for example, responsibility based testing and integration and performance testing.

Figure 3:
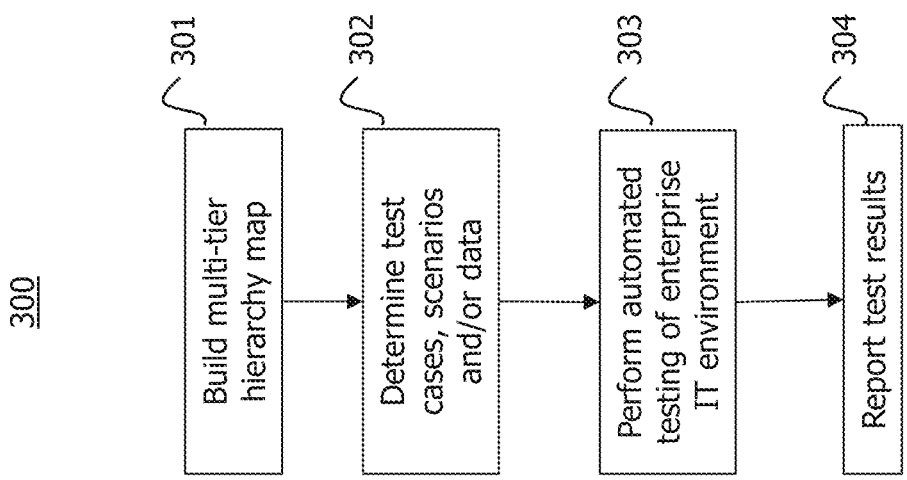
FIG. 3 illustrates a flow diagram of an algorithm used by the architecture of FIG. 2 in accordance with one or more aspects of the disclosure.

As described above, FIG. 3 illustrates a flow-diagram 300 of an algorithm used by the architecture of FIG. 2 in accordance with one or more aspects of the disclosure.

As shown, at step 301, the multi-tier hierarchy map is built, based on provided source code and database reflecting the current state of the enterprise IT environment, which multi-tier hierarchy map is saved to the database 230. The multi-tier hierarchy map, for each tier, maps the enterprise IT environment 20 across the different systems 22 and technologies of the enterprise IT environment 20.

At step 302, test cases, scenarios and/or data are determined by the test generation engine 242 based on data retrieved about the source system from the database 230. Synthetic test cases, scenarios and/or data may also be generated by the test generation engine 242 based on data retrieved about the source system from the database 230.

At step 303, the enterprise IT environment is tested by the auditor 244, which utilizes the multi-tier hierarchy and the test scripts, scenarios, cases and/or data to perform the testing. The testing may include, for example, integration testing, white box testing and/or black box testing. The testing may include testing the enterprise IT environment across and among systems 22 and technologies against business and/or technical requirements or test scenarios.

At step 304, test results are reported via the dashboard 220, which provides the interactive platform by which the user may interact with the generated reports. The reports may include the complete details of a particular service operation or task or corresponding transactions, source code or data elements, generated in accordance with the multi-tier hierarchy and tested by the testing engine. Such reports may relate to a current state analysis, a target state analysis, a test case analysis, and a business rule analysis. The reports may also provide a visual mapping between current and target states, including scenario based simulation visualization.

In accordance with foregoing embodiments, examples, and/or aspects of the invention, source code of all source files relevant to a desired configuration are automatically parsed and all dependencies between functions and transactions across application boundaries are identified. For any function or transaction, it is possible to identify all relevant callers across application boundaries at any point in time. End-to-end traceability of functions, transactions, or services across application boundaries is provided. A call trace may be viewed by starting at any level of the call hierarchy, and the callers can be traced to the source application that invokes the relevant function, transaction, or service. The embodiments of the invention provide the ability to search all callers of a particular function, transaction, or service across application tiers, and callers may be searched by starting at the application boundary level. In addition, potential orphans and duplicates can be identified at any point, with the call hierarchy function usable to identify duplicates.

In a further aspect of the disclosure, as discussed herein, an easy-to-use, intuitive GUI is provided that includes the dashboard that permits a user to view end-to-end traceability of relevant functions, transactions, or services, and to view and navigate between the tiers of the multi-tier hierarchy. Links may be provided within the GUI that can be clicked by a user in order to navigate directly to the relevant code from a given use case, test case, or business rule, and vice versa.

In a further aspect of the disclosure, test scripts may be generated that include coverage managers testing rules engines (risk or change based), use capture, invocation of changes across technology landscape and hierarchy maps updates. Test data may also be advantageously managed, including the generation and use of synthetic data, data selection, and data harnessing. In addition, test results may be validated, including by way of stage gate features, test results and workflow opportunities. Specialized testing may accordingly be achieved, including web services/SQA testing, database and middleware and business process testing, compliance and validation testing. Regression testing, certification and reverse certification may also be facilitated, e.g., for consolidation, modernization, upgrades, mergers and acquisitions integrations, and platform migrations.

While certain exemplary embodiments have been described and shown in the accompanying drawings, it is to be understood that such embodiments are merely illustrative of and not restrictive on the broad inventions, and that this inventions not be limited to the specific constructions and arrangements shown and described, since various other modifications may occur to those ordinarily skilled in the art.

The invention claimed is:

1. A system for auditing an enterprise IT environment, the system comprising:
a multi-tier hierarchy generator configured to generate a multi-tier hierarchy (a) from parsed source code of a plurality of software applications of different types, and (b) based on dependencies between and among tier elements of the enterprise IT environment across application boundaries of the plurality of software applications, as identified from the parsed source code, wherein the multi-tier hierarchy maps, between and within each tier, the IT environment across the application boundaries, and wherein the multi-tier hierarchy at least maps execution dependencies for function, transaction and service calls associated with service operations across the software applications;
a test generation engine configured to automatically generate test cases, test scenarios, test scripts and test data based on intake data about the IT environment;
an auditing unit configured to test the IT environment based on the test cases, test scenarios, test scripts, test data and the multi-tier hierarchy, against business and/or technical requirements; and
a dashboard comprising a graphical user interface via which a user may visually navigate the test cases and test scenarios among and between tiers of the multi-tier hierarchy.

2. The system of claim 1, wherein the testing comprises: integration testing, white box testing and/or black box testing.

3. The system of claim 1, wherein the testing identifies gaps by checking whether one or more implementations are: different from the requirements, missing for the requirements, and/or does not correspond to the requirements.

4. The system of claim 3, wherein the gaps are associated with one or more tiers of the multi-tier hierarchy.

5. The system of claim 1, wherein the IT environment is a target IT environment.

6. A method for auditing an enterprise IT environment, the system comprising:
generating a multi-tier hierarchy (a) from parsed source code of a plurality of software applications of different types, and (b) based on dependencies between and among tier elements of the enterprise IT environment across application boundaries of the plurality of software applications, as identified from the parsed source code, wherein the multi-tier hierarchy maps, between and within each tier, the IT environment across the application boundaries, and wherein the multi-tier hierarchy at least maps execution dependencies for function, transaction and service calls associated with service operations across the software applications;
automatically generating test cases, test scenarios, test scripts and test data based on intake data about source systems of the IT environment;
checking IT environment requirements against the IT environment based on the test cases, test scenarios, test scripts, test data and the multi-tier hierarchy, against business and/or technical requirements; and
proving a dashboard comprising a graphical user interface via which a user may visually navigate the test cases and test scenarios among and between tiers of the multi-tier hierarchy.

7. The method of claim 6, wherein the testing comprises: integration testing, white box testing and/or black box testing.

8. The method of claim 6, wherein the testing identifies gaps by checking whether one or more implementations are: different from the requirements, missing for the requirements, and/or does not correspond to the requirements.

9. The system of claim 8, wherein the gaps are associated with one or more tiers of the multi-tier hierarchy.

10. The system of claim 6, wherein the IT environment is a target IT environment.

* * * * *